(12) United States Patent
Andreux et al.

(10) Patent No.: US 7,597,796 B2
(45) Date of Patent: Oct. 6, 2009

(54) APPARATUS AND PROCESS FOR CATALYTIC CRACKING OF TWO DISTINCT HYDROCARBON FEEDS

(75) Inventors: Régis Andreux, Francheville (FR); Jean-Luc Duplan, Irigny (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 524 days.

(21) Appl. No.: 11/269,876

(22) Filed: Nov. 9, 2005

(65) Prior Publication Data
US 2006/0113217 A1 Jun. 1, 2006

(30) Foreign Application Priority Data
Nov. 9, 2004 (FR) .................................. 04 11956

(51) Int. Cl.
*C10G 11/18* (2006.01)
*C10G 51/06* (2006.01)
*B01J 8/26* (2006.01)

(52) U.S. Cl. ..................... 208/113; 208/78; 422/141; 422/145

(58) Field of Classification Search .................. 208/46, 208/78, 106, 116, 113; 422/129, 139, 141, 422/145
See application file for complete search history.

(56) References Cited

U.S. PATENT DOCUMENTS 3,440,020 A 4/1969 Owen
4,417,974 A 11/1983 Haunschild et al.
5,114,700 A 5/1992 Meihack et al.
5,194,227 A 3/1993 Miller et al.
6,296,812 B1 10/2001 Gauthier et al.
6,616,899 B1 9/2003 Upson
2004/0079679 A1 * 4/2004 Gauthier et al. ............. 208/113

FOREIGN PATENT DOCUMENTS

EP 1 413 622 A 4/2004
WO WO 01/85872 A 11/2001

OTHER PUBLICATIONS

Definition for "around" available at http://dictionary.reference.com/browse/around.*
Definition for "around" available at http://dictionary.reference.com/browse/around (2009).*

* cited by examiner

*Primary Examiner*—Glenn Caldarola
*Assistant Examiner*—Randy Boyer
(74) *Attorney, Agent, or Firm*—Millen, White, Zelano, Branigan, P.C.

(57) ABSTRACT

The present invention concerns an apparatus and associated process for the catalytic cracking of oil cuts in a fluidized bed. The apparatus and process can catalytically crack a conventional feed in a principal riser B and crack a secondary feed in at least one secondary riser C. The lower end of the secondary riser or risers C is open to the bottom portion of the principal riser B; the upper end of the secondary riser or risers C is open to the top portion of the principal riser B.

17 Claims, 1 Drawing Sheet

APPARATUS AND PROCESS FOR CATALYTIC CRACKING OF TWO DISTINCT HYDROCARBON FEEDS

Figure 1:
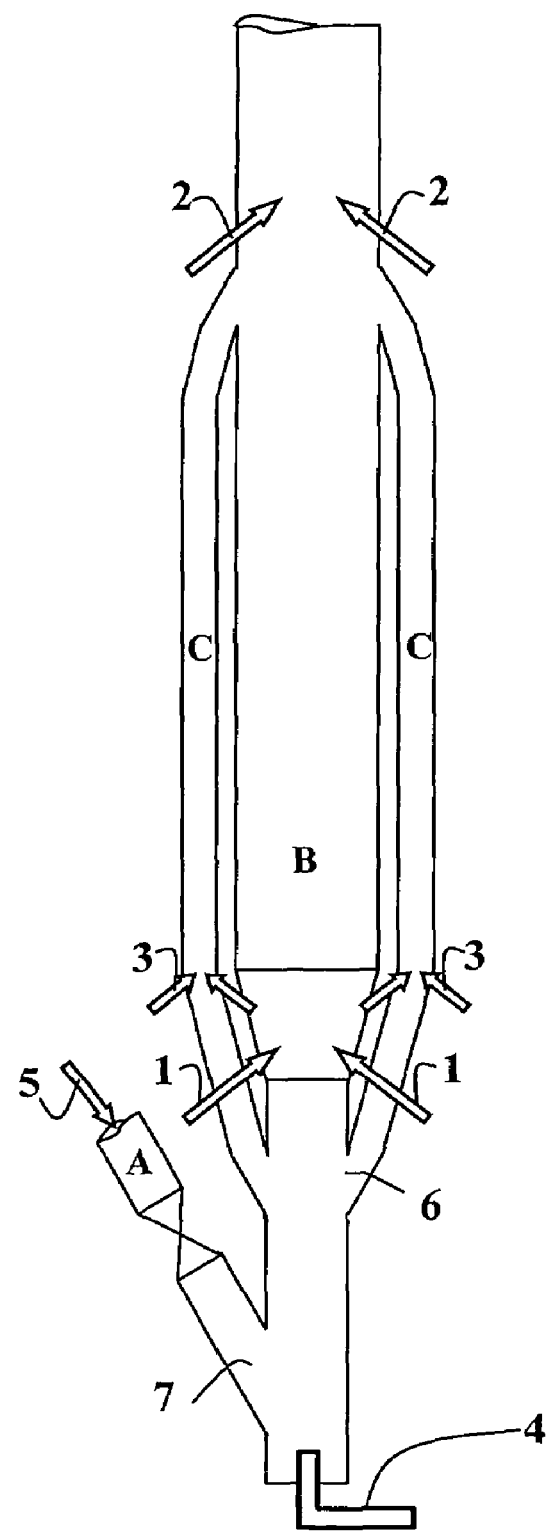

The present invention relates to an apparatus and associated process for catalytically cracking petroleum cuts in the transported phase or fluidized bed, generally described in the art as fluid catalytic cracking or FCC. The treated feeds may, for example, be distillates and/or hydrotreated residues such as atmospheric distillation or vacuum distillation residues, or visbreaking residues.

More particularly, the field of the invention comprises cracking during an FCC process of petroleum cuts in a unit allowing joint cracking of two feeds of differing natures, hereinafter termed the conventional feed and secondary feed. In the remainder of the description, the term "conventional feed" will be used to designate a conventional oil feed, i.e. normally treated in the refinery in an FCC unit; the term "secondary feed" will be used to designate a secondary petroleum cut.

An FCC unit normally comprises a reaction zone for cracking a conventional feed. Said zone usually comprises a vertical tube, normally known as the riser, in which the gas-solid flow is generally an upflow. In general, the FCC unit also comprises a zone for separating gaseous products from the solid catalyst, a stripping zone and a regeneration zone in which the coke produced during cracking deposited on the solid catalyst is burned off. Some embodiments of that type of unit also include a principal reaction zone and a secondary reaction zone for cracking a second petroleum cut.

The aim of that particular disposition is to create more severe cracking conditions in said secondary reaction zone, i.e. higher reaction temperatures and/or higher ratios of the flow rate of catalyst to the flow rate of feed. Such a disposition has the advantage of being able to treat feeds with different natures in the one unit which do not have the same optimum cracking conditions.

In a first implementation, some publications describe installing a tube defining a secondary zone positioned in the conventional reaction zone, the principal riser defining the conventional reaction zone and the tube defining the secondary cracking zone (or secondary riser) being in coaxial, concentric and parallel positions.

As an example, the principle of cracking a petroleum cut in a secondary riser in an FCC unit has been described in United States patent U.S. Pat. No. 3,440,020. The conventional reaction zone and the secondary reaction zone are constituted by two coaxial tubes and the secondary riser is internal to the conventional riser. The outlet from the secondary riser is above the outlet from the principal riser. The inlet for the secondary riser is positioned in the bottom region of the principal riser. Two different petroleum cuts may be converted separately from each other under different cracking conditions.

U.S. Pat. No. 4,417,974 describes installing a secondary reaction zone in an FCC unit in a configuration similar to the preceding case, but wherein the outlet is below the outlet for the principal riser. The secondary reaction products and the catalyst used in this reaction are thus mixed with the reagents for the conventional reaction and transported therewith to the top of the principal riser. The conventional feed has a high catalyst deactivating power. The secondary feed has low catalyst deactivating power.

The advantage of said disposition in which the principal and secondary zones are defined by concentric tubes is to be able to use catalyst particles which are weakly coked during cracking of the secondary feed at the outlet from the secondary riser to carry out secondary cracking of the conventional feed in the upper portion of the principal riser or reactor. The weakness of that configuration with an internal tube becomes apparent when the space available in the unit is small, for example with units with a small reaction zone diameter.

In that case:
(i) the presence of the internal tube perturbs the hydrodynamics of the reaction zone for the principal riser and has a non negligible impact on cracking of the conventional feed; as an example, the modification induced in the residence times of the reagents or the resulting increase of back-mixing phenomena has the effect of significantly modifying the yields of the various reagents and/or of reducing the selectivity of the reaction towards upgradable products at the reactor outlet.
(ii) The mechanical stresses and erosion to which the secondary riser is subjected are large due to the proximity of the injectors for the conventional feed.

In a further implementation, the tube defining the secondary zone is parallel but not coaxial with the principal tube but positioned outside it, the inlets and outlets from the secondary reaction zone then being isolated from those of the principal reaction zone. As an example, U.S. patent application US 2003/044327 proposes an external, isolated and independent secondary reaction zone similar to the conventional reaction zone. The catalyst and the petroleum feed are both injected into each reaction zone using the same principle. The coked catalyst and the reaction products from the two reaction zones are mixed in the dilute zone of the stripping zone. The cracking conditions in each reaction zone are adjusted independently.

In a further example, U.S. Pat. No. 6,287,522 describes a double riser system similar to that described above, but the products of each reaction are not mixed in the dilute zone of the stripping zone. A cyclone connected directly to the head of the tube for the secondary reaction can separate the catalyst and the secondary reaction products by isolating the latter from the conventional reaction products.

The advantage of locating a secondary riser externally to the principal riser is the complete independence of the cracking conditions imposed in the two zones. This means that the conventional and secondary feeds can be treated under predetermined, optimized conditions. The disadvantage of such a configuration, however, is that a still active catalyst cannot be used at the outlet from the secondary riser.

According to the present invention, an apparatus and an associated process are proposed which can combine the advantages of known prior art configurations as previously disclosed, while overcoming the disadvantages described for each of them.

Thus, the invention can treat a conventional feed and a secondary feed in the same unit under particular cracking conditions for each thereof to allow optimum catalyst use, in particular at the outlet from the secondary riser.

In its most general form, the invention concerns an apparatus for catalytically cracking a conventional feed and a secondary feed comprising
a principal riser B defining a conventional reaction zone;
a transfer line A for the principal riser B supplying fresh catalyst or catalyst from a regeneration unit;
means for injecting conventional feed into the principal riser B;
means for injecting atomization vapour into the principal riser B;
said apparatus further comprising:
at least one secondary riser C parallel to the principal riser B, defining a secondary reaction zone to crack a secondary feed, the lower end of which is open to the bottom portion of the principal riser B and the upper end of which is open to the top portion of the principal riser B; and means for injecting a secondary feed into the secondary riser or risers C;

means for controlling the cracking conditions for the secondary feed.

In a second possible implementation, the apparatus comprises at least two secondary risers parallel to the principal riser B, the angles between two adjacent secondary risers being substantially equal with respect to the principal riser.

As an example, the means for controlling the cracking conditions for the secondary feed may comprise means for injecting a cooling liquid into the upper portion of the principal riser B.

Usually, the connection point or points between the conventional and secondary reaction zones are positioned below the point for injecting conventional feed into the riser B.

In a possible implementation, the point for injecting conventional feed into the riser B may be located below or, as is preferable, above the point for connecting the catalyst transfer line A and the principal riser B.

The point for injecting the secondary feed into the secondary riser(s) C may, as is preferable, be located above the point or points between the conventional zone and secondary reaction zone(s) (which is between principal riser B and secondary riser(s) C).

Preferably, the connection point or points between the conventional and secondary reaction zones are located above and close to the point for injecting catalyst into the riser B, i.e. at the end of the line A.

In one possible implementation, the means for controlling the secondary cracking conditions also comprise at least one valve for adjusting the flow rate of solid catalyst to the secondary riser.

The present invention also concerns a process employing the apparatus described above.

In general, the cracking conditions in the secondary reaction zone and/or in the conventional reaction zone are adjusted at least in part by vaporizing a variable quantity of cooling liquid injected via means for injecting liquid into the upper portion of the principal riser B.

Advantageously, the length and diameter of the secondary riser are selected so that the mean residence time for compounds is in the range from about 0.1 to about 10 seconds.

Usually, the temperature of the secondary reaction zone is in the range 560° C. to 620° C. and the ratio C/O of the flow rate of catalyst over the flow rate of secondary feed is in the range from about 2 to about 100.

The conventional feed which may be treated with the present apparatus may comprise hydrotreated residues and/or distillates, such as atmospheric distillation residues or vacuum distillation residues, or visbreaking or distillation residues.

The secondary feed which may be treated with the present apparatus may comprise a hydrocarbon feed with a molar mass in the range 65 g/mol to 285 g/mol.

Advantageously, a catalyst comprising a faujasite type Y zeolite and 2% to 10% by weight of a ZSM-5 zeolite may be used to crack the conventional feed and/or to crack the secondary feed.

In an advantageous implementation of the invention, a rapid separation apparatus comprising a plurality of separation chambers and fluid circulation or stripping chambers or a plurality of chambers dedicated in succession to separating and stripping fluids is used to separate solid catalytic particles and gaseous products from the cracking reaction.

The invention will be better understood from the following description of an implementation of the invention, illustrated using FIG. 1 and given purely by way of illustration, i.e. not limiting any of the described aspects of the scope of the present invention.

The present invention may advantageously, for example, be implemented when modernizing an FCC unit which functions conventionally, i.e. with a single riser and fluid upflow. Before installing a secondary reaction zone in accordance with the invention, the unit comprises:

a principal riser B defining a conventional reaction zone;

a transfer line A for the principal riser B supplying catalyst via a line 5 from a catalyst regeneration unit (not shown in FIG. 1);

means 1 for injecting conventional feed into the principal riser B, mixed with atomization vapour;

optional additional means 4 for atomizing vapour in the riser B in accordance with certain techniques in frequent use in the field.

The unit may optionally comprise means 2 for injecting a cooling liquid into the upper portion of the riser B, as described in U.S. Pat. No. 4,818,372 and hereinafter termed MTC.

In accordance with the invention, the unit further comprises, for example following modernization, two vertical tubes C or secondary risers parallel to the principal riser B, symmetrically disposed with respect to the principal riser B. The lower end of each secondary riser is open at the bottom portion of the principal riser and the upper end of each secondary riser is open at the top portion of the principal riser. The secondary feed is injected into the bottom portion of each of the secondary risers, optionally mixed with the atomization vapour, via injection means 3.

The lower connection 6 between the principal riser and the secondary risers is located upstream of the injection point 1 for the conventional feed in the fluid movement direction. The terms "upstream" and "downstream" as used in the present description refer to the direction of fluid advance.

Preferably, the injection means 3 are located near the lower connection 6 between the principal and secondary risers, to increase the mean residence time of the reagents in the riser (s).

In accordance with the invention, the point 1 for injecting conventional feed into the riser B may be located below or, as is preferable, above the connection point 7 between the transfer line for catalyst A and the principal riser B.

To optimize the flow in the principal and secondary reaction zones, the lower connection point 6 between the two zones may advantageously be positioned below and as low as possible with respect to the point 1 for injecting conventional feed into the riser B. Preferably, said lower connection point 6 is located above and as close as possible to the point 7 for injecting catalyst into the riser B, i.e. at the end of the line A.

The upper connection between the principal riser and the secondary risers is located upstream of the point 2 for injecting MTC liquid.

In a variation of the invention, the number of secondary risers around the principal riser may be increased. As an example, the number of said risers may be in the range 2 to 10. Advantageously, in this case the angles between two adjacent secondary risers are equal.

The present invention is advantageously used to crack a petroleum cut in a reaction zone installed in a conventional fluidized bed catalytic cracking unit. In accordance with the invention, the cracking conditions in said secondary reaction zone are different and substantially independent of the cracking conditions for the conventional feed. The expression "substantially independent" as used in the present description means that a variation in the conditions in the primary (or secondary) zone does not result in a significant variation in the conditions in the secondary (or primary) zone although a small influence is clearly acceptable.

The substantially independent cracking conditions in the two zones may, for example, be achieved by means of a valve system for regulating the flow rate of solid catalyst on the secondary riser or by dint of a system for extracting heat by injecting a cooling liquid into the upper portion of the principal riser, as indicated by reference numeral 2 in FIG. 1. An association of these two implementations or any other known method for controlling the cracking conditions based, for example, on extracting heat from fluids at the riser outlet may also be used in the invention.

In the conventional FCC unit, the conventional feed is cracked in a vertical column or riser in contact with solid catalyst particles. The flow is a vertical co-current upflow, the various phases introduced being entrained by the atomization vapour, generally steam, introduced into the bottom of the reactor and/or mixed with the feed. The feed is introduced in the liquid form, and is heated then generally mixed with superheated vaporization steam. The feed is vaporized in contact with hot catalyst from the regenerator, and cracked as it rises towards the top of the riser.

In the context of the present invention, the function and control of the principal reaction zone does not change. The properties of the conventional feed are standard, i.e. the feeds are identical to those normally treated by this type of unit.

The secondary feed is generally characterized by a cokefaction capacity, i.e. the capacity to induce deposition of coke on the catalyst during the cracking reaction, which is lower than that of the conventional feed. Further, the conditions for cracking the secondary feed are usually more severe than those for the conventional feed. In one possible implementation of the invention, the secondary feed has a molar mass in the range 65 g/mol to 285 g/ml and may, for example, be a C5-C20 cut, or even a molar mass in the range 115 g/mol to 170 g/mol, for example a C8-C12 cut.

The secondary feed is injected into the base of the secondary riser in the liquid form and comes into contact with a portion of the hot catalyst from the regenerator introduced into the bottom of the principal riser. The feed vaporizes and cracks. The temperature in the secondary reaction zone may be in the range 540° C. to 660° C., preferably in the range 560° C. to 620° C. The ratio of the catalyst flow rate/secondary feed flow rate, generally designated in the field by the term "Cat/Oil" or "C/O ratio", is in the range 2 to 100, preferably in the range 4 to 20, more preferably in the range 5 to 15. Using techniques which are known to the skilled person, the dimensions of the secondary riser are determined as a function of the envisaged operating conditions (for example, the possible range for the catalyst flow rate or the possible temperature range for each zone) so that the pressure balance in this zone creates an air lift effect generating a continuous and sufficient supply of catalyst to the secondary riser. The length and diameter of the secondary riser are usually calculated using known techniques to obtain a mean residence time for the compounds in the range from about 0.1 to about 10 seconds, preferably in the range about 0.1 to about 3 seconds.

According to the invention, the cracking temperature and C/O ratio in the secondary reaction zone are naturally fixed by the thermal balance of the unit and may, for example, be adjusted using means 2 for cooling the flow above the upper connection for the principal riser and the secondary riser and/or a system of valves controlling the flow rate of the catalyst on the secondary riser (not shown in FIG. 1), as previously described.

When the flow is cooled by a heat extraction system, the invention preferably employs vaporization of a liquid introduced into said zone, as proposed in U.S. Pat. No. 4,818,372. In that case, the selected liquid can readily be vaporized at the operating temperature of the reactor, such as an aromatic C6-C8 cut. The ratio of the flow rate of liquid to be injected to control the cracking conditions in the secondary reaction zone to the flow rate of the secondary petroleum cut is usually in the range 1/10 to 7/1, preferably in the range 1/2 to 5/2. As an example, the use of a MTC cooling liquid described in U.S. Pat. No. 4,818,372 can advantageously increase the previously described C/O ratio.

The bulk expansion due to cracking of the secondary feed may advantageously be compensated by the conical shape of the base of the secondary risers.

Given that the properties and cracking conditions are generally more severe for the secondary feed, the catalyst at the outlet from the secondary riser or risers C is less coked. Said catalyst, which is still highly active, is evacuated in the principal riser B with the gas formed in the secondary riser and mixed with the principal reaction flow, thus generating supplemental cracking of the conventional feed.

According to the invention, the present apparatus may advantageously be associated with an apparatus for rapid separation comprising a plurality of separation chambers and chambers for circulating (stripping) fluids or a plurality of chambers dedicated in succession to separating and stripping fluids as described, for example, in U.S. Pat. No. 6,296,812. Such an apparatus is particularly suitable for subsequent separation of solid catalytic particles and gaseous products coming from the present catalytic cracking apparatus as it can reduce thermal degradation of upgradable fractions from the reaction, such as gasoline or gas oil fractions following secondary cracking reactions in the top of the riser or the separator.

The following non limiting examples illustrate the advantages of the present invention.

EXAMPLE 1

This example illustrates a reference case corresponding to a conventional FCC unit with no secondary reaction zone installed. The secondary feed is injected as a mixture with the principal feed.

The FCC unit under consideration was equipped with a single regeneration stage; the cracking conditions are described in Table 1.

TABLE 1

| FCC UNIT OPERATIONAL CONDITIONS | | |
|---|---|---|
| Parameters | Units | Values |
| Cracking temperature | ° C. | 525 |
| Feed flow rate | t/h | 176 |
| Catalyst flow rate | t/h | 1077 |
| C/O | — | 6.12 |
| Regenerator temperature | ° C. | 701 |
| Flow rate of air to regenerator | t/h | 108 |
| Flow rate of cooling liquid | % | 0 |

The catalyst used was a catalyst based on faujasite type Y zeolite comprising 5% by weight of ZSM-5 zeolite.

The conventional feed was a heavy petroleum cut; the secondary feed was a heavy C8-C12 gasoline cut; the reactor cooling liquid was a heavy high density gasoline. Their properties are shown in Table 2.

TABLE 2

PROPERTIES OF FEEDS AND COOLING LIQUID

|  | Units | Conventional feed | Secondary feed | MTC |
|---|---|---|---|---|
| Density 15° C. | Kg/dm³ | 0.909 | 0.736 | 0.800 |
| T, TBP 50% (to be defined) | ° C. | 459 | 96 | 150 |
| Molar mass | g/mol | 433 | 127 | 297 |

EXAMPLE 2

This example employed an FCC unit comprising a secondary reaction zone in accordance with the invention conforming to that described above with reference to FIG. 1. This time, the secondary feed was injected into the secondary riser. The catalyst used, the feeds and the cooling liquid were the same as those used in Example 1.

EXAMPLE 3

The impact of the presence of a secondary reaction zone on the structure of the cracking yield of the conventional feed was studied by comparing the results obtained for the apparatus of Examples 1 and 2.

The following parameters were kept constant during this study:

1— The flow rate of the conventional petroleum cut;
2— The cracking temperature for the conventional feed, fixed at 525° C.: the cracking conditions in the top zone of the conventional riser remained constant;
3— The temperature of the inert flow cooling liquid, fixed at 330° C.;
4—The temperature of the mixture upstream of the flow cooling liquid injection: the vaporization conditions for the conventional feed remained constant.

The parameters which were varied to keep the above parameters constant were as follows:

1) The total catalyst flow rate;
2) The fraction of the total catalyst flow traversing each reaction zone;
3) The flow rate of the cooling liquid.

The conditions relating to cracking the secondary feed were as follows: the flow rate of the secondary petroleum cut was 6% of the flow rate of the conventional petroleum cut in Examples 1 and 2. The cracking temperature for the secondary petroleum cut was 600° C. in the secondary riser.

Table 3 below summarizes the operating conditions and the cracking yields for the conventional feed in the two cases.

A substantial increase in the overall feed conversion was observed. Further, the propylene production increased by 33% compared with the reference case when the present invention was implemented. Further, conversion of the heaviest products which are the most difficult to upgrade (slurry, LCO) was substantially increased with the present invention. At the same time, the production of intermediate high added value products (gasoline) was only slightly down and an increase in both the production of upgradable LPG and of dry gas was observed. These phenomena may be explained by an increase in the secondary cracking reactions as described above. The use of a rapid separator or apparatus at the riser outlet, for example as described in U.S. Pat. No. 6,296,812, could advantageously maintain the gasoline production and reduce the production of dry gas and coke.

| Parameter | Units | Example 1 | Example 2 |
|---|---|---|---|
| Temperature of mixture upstream of injecting cooling liquid | ° C. | 529 | 529 |
| Conventional cracking temperature | ° C. | 525 | 525 |
| Secondary cracking temperature | ° C. | 525 | 600 |
| Conventional feed flow rate | t/h | 176 | 176 |
| Secondary feed flow rate | (% of principal feed flow rate) | 6 | 6 |
| Flow rate of conventional catalyst | t/h | 1077 | 947 |
| Flow rate of secondary catalyst | t/h | — | 140 |
| Total catalyst flow rate | t/h | 1077 | 1087 |
| Conventional C/O in vaporization zone | — | 6.12 | 5.38 |
| Conventional C/O in top zone of riser | — | 6.12 | 5.82 |
| Secondary C/O | — | — | 13.20 |
| Regenerator temperature | ° C. | 701 | 724 |
| Flow rate of regenerator air | t/h | 108 | 125 |
| Flow rate of cooling liquid | % | 0 | 10.40 |
| Yield, riser outlet |  |  |  |
| Conversion | % | 75.43 | 77.24 |
| Dry gases (H—C1–C2) | wt % | 2.77 | 3.20 |
| LPG (C3–C4) | wt % | 15.42 | 18.59 |
| Light gasoline (C5-160°) | wt % | 42.50 | 40.50 |
| Heavy gasoline (160–220) | wt % | 10.15 | 9.57 |
| LCO (220*–360°) | wt % | 14.87 | 13.91 |
| Slurry (360+**) | wt % | 9.70 | 8.85 |
| Coke | wt % | 4.50 | 5.19 |
| C3= | wt % | 4.22 | 5.62 |

*hydrocarbons with a boiling point of 160° C. or less
**hydrocarbons with a boiling point of more than 360° C.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 0411956, filed Nov. 9, 2004 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus for catalytically cracking a conventional feed and a secondary feed comprising
a principal riser (B) defining a conventional reaction zone;

a transfer line (A) for the principal riser (B) supplying fresh catalyst or catalyst from a regeneration unit;

means (1) for injecting conventional feed into the principal riser (B);

means for injecting atomization vapor into the principal riser (B); said apparatus further comprising:

at least one secondary riser (C) parallel to the principal riser (B), the lower end of which is open to the bottom portion of the principal riser (B) and the upper end of which is open to the top portion of the principal riser (B), said secondary riser(s) being external to the principal riser (B) and defining a secondary reaction zone for cracking of a secondary feed; and means (3) for injecting a secondary feed into the secondary riser or risers (C);

means for controlling the cracking conditions for the secondary feed.

2. An apparatus according to claim 1, comprising at least two secondary risers parallel to the principal riser (B), the angles between two adjacent secondary risers being substantially equal with respect to the principal riser.

3. An apparatus according to claim 1, in which the means for controlling the cracking conditions for the secondary feed comprise means (2) for injecting a cooling liquid into the upper portion of the principal riser (B).

4. An apparatus according to claim 1, in which the connection point or points (6) between the conventional and secondary reaction zones are positioned below the point (1) for injecting conventional feed into the riser (B).

5. An apparatus according to claim 1, in which the point (1) for injecting conventional feed into the riser (B) is located below or above the point (7) for connecting the catalyst transfer line (A) and the principal riser (B).

6. An apparatus according to claim 1, in which the connection point or points between the conventional and secondary reaction zones are located above and close to the point (7) for injecting catalyst into the riser (B).

7. An apparatus according to claim 1, in which the means for controlling the secondary cracking conditions further comprise at least one valve for adjusting the flow rate of solid catalyst to the secondary riser.

8. A process of catalytically cracking feeds comprising passing said feeds into the apparatus of claim 1.

9. A process according to claim 8, in which the cracking conditions in the secondary reaction zone and/or in the conventional reaction zone are adjusted at least in part by vaporizing a variable quantity of cooling liquid injected via means (2) for injecting said liquid into the upper portion of the principal riser (B).

10. A process according to claim 8, in which the length and diameter of the secondary riser are selected so that the mean residence time for compounds is in the range from about 0.1 to about 10 seconds.

11. A process according to claim 8, in which the temperature of the secondary reaction zone is in the range 560° C. to 620° C. and the ratio C/O of the flow rate of catalyst over the flow rate of secondary feed is in the range from about 2 to about 100.

12. A process according to claim 8, in which the conventional feed comprises distillates and/or hydrotreated residues such as atmospheric distillation residues or vacuum distillation residues, or visbreaking or distillation residues.

13. A process according to claim 8, in which the secondary feed comprises a hydrocarbon feed with a molar mass in the range 65 g/mol to 285 g/mol.

14. A process according to claim 8, wherein said catalyst comprises a faujasite type Y zeolite and 2% to 10% by weight of a ZSM-5 zeolite in order to crack the conventional feed and/or to crack the secondary feed.

15. A process according to claim 8, in which a rapid separation device comprising a plurality of separation chambers and fluid circulation or stripping chambers or a plurality of chambers dedicated in succession to separating and stripping fluids is used to separate solid catalytic particles and gaseous products from the cracking reaction.

16. An apparatus according to claim 1, comprising 2 to 10 secondary risers parallel to and disposed around the principal riser (B).

17. An apparatus according to claim 6, wherein the connection point or points between the conventional and secondary reaction zones are located at the end of line (A).

\* \* \* \* \*

UNITED STATES PATENT AND TRADEMARK OFFICE
CERTIFICATE OF CORRECTION

PATENT NO.       : 7,597,796 B2                                         Page 1 of 1
APPLICATION NO.  : 11/269876
DATED            : October 6, 2009
INVENTOR(S)      : Andreux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 855 days.

Signed and Sealed this

Twenty-eighth Day of September, 2010

David J. Kappos
*Director of the United States Patent and Trademark Office*